May 8, 1956  C. BALLHAUSEN  2,744,991
METHOD OF AND APPARATUS FOR ADJUSTING THE SPARK GAP
LENGTH IN METALWORKING APPARATUS BY WHICH METAL
MAY BE REMOVED OR ERODED BY SPARKING
Filed Sept. 14, 1953
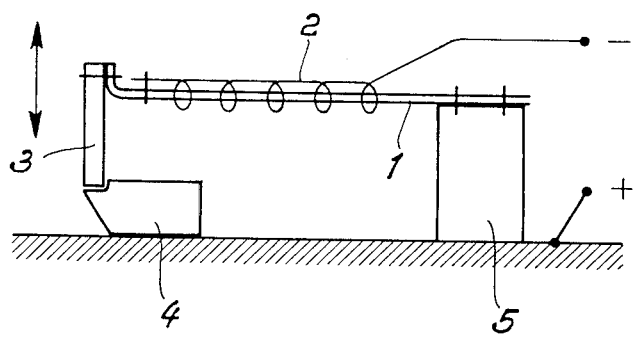
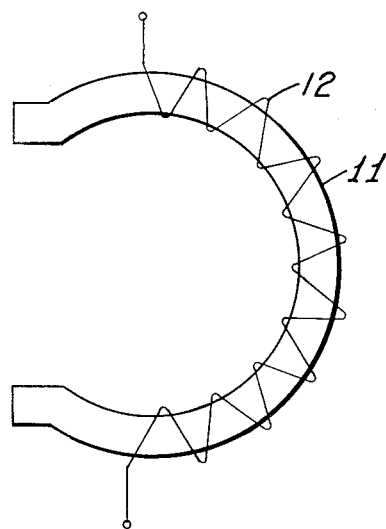
Inventor:
Carl Ballhausen
By Cushman, Darby
& Cushman
attys.

United States Patent Office 2,744,991
Patented May 8, 1956

2,744,991

METHOD OF AND APPARATUS FOR ADJUSTING THE SPARK GAP LENGTH IN METALWORKING APPARATUS BY WHICH METAL MAY BE REMOVED OR ERODED BY SPARKING

Carl Ballhausen, Krefeld, Germany, assignor to Deutsche Edelstahlwerke Aktiengesellschaft, Krefeld, Germany Application September 14, 1953, Serial No. 379,898

Claims priority, application Germany September 17, 1952

6 Claims. (Cl. 219—15)

The present invention relates to a method of and apparatus for adjusting the spark gap length in metal working apparatus wherein metal workpieces can be worked with removal or emosion of material by sparking between an electrode and the workpiece produced by an alternating current, in particular one of high-frequency, or by means of condenser discharges. The electrode and the workpiece are generally situated in a cooling medium, preferably an oil of suitable composition.

The invention relates to a method of and apparatus for adjusting the length of the spark gap producing the erosion. It is necessary to ensure that during the material-removing treatment the distance of the electrode from the workpiece must always be such as (a) to ensure sparking across the gap, and (b) to avoid fusing of the electrode to the article to be worked. It has already been proposed to regulate the spark gap length by automatic apparatus operated either hydraulically or electrically. An electrically operated apparatus that has been proposed comprises an electric motor to control the forward feed of the electrode, the said motor being in turn so controlled by the sparkgap voltage that the distance of the electrode from the workpiece from which the material is to be removed remains constant and the increase in the distance as a result of the removal of material is thus compensated. For this purpose, however, it has been necessary to employ complicated circuit arrangements and electrical equipment which are costly and unduly bulky by reason of the presence of the forward feed motor.

The object of the invention is to provide a simpler and less costly method and apparatus for achieving the desired regulation.

The method according to the invention is characterised in that movement of the electrode to regulate the length of the spark gap is produced by means responsive to heat generated by the spark current fed to the electrode. A bimetallic strip serves particularly well as the temperature-responsive means. Instead of a bimetallic strip, a gas-filled or liquid-filled tube, for example, may be employed, which stretches or flexes when the fluid heated therein in response to heat generated by the said current expands.

The method will hereinafter be more particularly described with reference to a diagrammatic illustration of a preferred constructional form of the device according to the invention.

Figure 1 is a diagrammatical side view of one form of the invention; and

Figure 2 is a diagrammatical illustration of a further embodiment.

A bimetallic strip 1 is mounted at one end of an electrically insulating support 5 so as to act as a spring arm as hereinafter described. The spring force of the bimetallic strip is so adjusted that electrode 3 secured to the forward end of the bimetallic strip normally presses on the workpiece 4 which is to be worked by the removal of material therefrom. The electrically conducting base on which the workpiece 4 is situated and to which the support 5 is secured is connected to one pole of the current source, which supplies the spark current. The current is led to the electrode 3 through the winding 2, which is disposed around the bimetallic strip 1.

The force with which the bimetallic strip 1 presses the electrode 3 on to the workpiece 4 can be adjusted by screws or the like (not shown).

The arrangement may also be so designed that the current is fed directly by way of the bimetallic strip to or from the electrode 3 or the current may be fed partly through a winding 2 and partly through the bimetallic strip. In any case, the bimetallic strip is heated by the spark-producing current so that the strip bends and forms a sparking gap, the device being designed so that the distance between the electrode and the workpiece becomes greater as heating increases and smaller on cooling.

The device operates as follows:

With the current switched off the electrode 3 presses on the workpiece with a predetermined spring force, so that when the current is switched on a predetermined short-circuit current flows, the value of which is determined by the applied voltage and the resistances and chokes provided. In accordance with the current strength, the bimetallic strip is so heated by the winding 2 or by the direct passage of current that the strip bends upwardly. The electrode 3 is consequently lifted from the workpiece and spark discharge takes place between the electrode and the workpiece. The current flowing during the spark discharge is smaller than the short-circuited current, but it can be made sufficient by suitable adjustment that a certain bending of the strip 1 and consequently a predetermined length of the spark gap are maintained.

It is advisable to effect the heating of the bimetallic strip by means of a winding when working with currents of low strength. With high current strengths, complete or partial resistance heating of the bimetallic strip may be expedient.

When the removal of material has progressed so far and the electrode has thus been so far moved that the initially adjusted spring force is relaxed, the spark discharge ceases.

The apparatus according to the invention is particularly suitable for operating on workpieces where a relatively small depth of removal is required, for example for forming steps or notches for the initiation of chip-removing work in tools tipped with hard metal or steel tools. Obviously the applicability of the method and apparatus according to the invention is not limited thereto, but the workpiece to be treated may be any electrically conductive metallic material.

The device may be modified by employing instead of the bimetallic strip a closed resilient tube which is filled with a suitable gas or a suitable liquid. As shown in Figure 2, 11 indicates a bent tube of any suitable form and made of thin sheet metal filled with a liquid or gas and expands when the sparking current passes through the coil 12 that is wound around the tube 11. The current may alternatively pass directly through the metal of the tube in substantially the same manner as the bimetallic strip 1, previously described. This temperature-responsive member is arranged in a manner corresponding to that described for the bimetallic strip. The spring force is produced by a curvature of the tube and, as a result of the heating by means of the winding 2 or due to the direct passage of current through the wall of the tube, the gas or liquid in the tube expands which has the effect of extending or flexing the tube and thus of correspondingly moving the electrode secured to one end thereof.

The device according to the invention may also operate in combination with a uniformly acting feed derived, for example, from a spindle. The constantly acting forward feed ensures that the necessary proximity of the workpiece to the electrode is maintained, while the automatically regulated movement ensures maintenance of the spark gap length.

What I claim is:

1. The method of adjusting the length of the spark gap in a metal-working apparatus where metal may be removed or eroded by sparking across a dielectric gap between an electrode and a metal workpiece, which consists in urging the electrode towards the workpiece by the force of an elastically energised resilient heat-deformable element and deforming said element in opposition to its resilient force by heat generated by the sparking current, thereby to preserve and regulate the spark gap whilst the metal workpiece is being eroded.

2. In metal working apparatus where the metal may be removed or eroded by sparking across a dielectric gap between an electrode and a metal workpiece, means for adjusting the length of the spark gap comprising a heat-deformable resilient element which is elastically energised to press the electrode towards a workpiece and is deformable by the heat generated therein by the sparking current fed to the electrode in opposition to its resilient force to regulate the gap in operation.

3. In metal working apparatus where the metal may be removed or eroded by sparking across a dielectric gap between an electrode and a metal workpiece, means for adjusting the length of the spark gap comprising at least one bimetallic strip to which the electrode is secured and which is elastically energisable to press the electrode towards the workpiece and is deformable by the heat generated therein by the sparking current fed to the electrode in opposition to its resilient force to regulate the gap during operation.

4. Apparatus according to claim 3 comprising a heating coil around said strip in the spark current line.

5. Apparatus according to claim 3 in which said bimetallic strip is connected in the spark current circuit.

6. Apparatus according to claim 2 in which said heat-deformable element is a fluid-filled resilient tube, said tube being deformable in response to the heat generated therein and in the enclosed fluid by the spark current to move the electrode away from the workpiece to preserve the gap.

References Cited in the file of this patent

UNITED STATES PATENTS

| | | |
|---|---|---|
| 219,209 | Brush | Sept. 2, 1879 |
| 1,318,147 | Herrick | Oct. 7, 1919 |
| 1,394,965 | Bourne | Oct. 25, 1921 |
| 1,500,268 | Replagle | July 8, 1924 |
| 1,610,552 | James | Dec. 14, 1926 |
| 2,303,153 | Woodworth | Nov. 24, 1952 |